United States Patent
Chmara et al.

(10) Patent No.: US 7,830,914 B1
(45) Date of Patent: Nov. 9, 2010

(54) TECHNIQUE FOR DELIVERING AND ENFORCING NETWORK QUALITY OF SERVICE TO MULTIPLE OUTSTATIONS

(75) Inventors: Thomas P. Chmara, Richmond (CA); Glenn Algie, Ottawa (CA)

(73) Assignee: Nortel Networks Limited, St. Laurent, Quebec ( * ) Notice: Subject to any disclaimer, the term of this patent is extended or adjusted under 35 U.S.C. 154(b) by 1488 days.

(21) Appl. No.: 10/274,083

(22) Filed: Oct. 21, 2002

Related U.S. Application Data

(60) Provisional application No. 60/364,024, filed on Mar. 15, 2002.

(51) Int. Cl.
*H04J 3/16* (2006.01)
*H04L 12/56* (2006.01)

(52) U.S. Cl. .................. 370/468; 370/395.41

(58) Field of Classification Search ............... 370/230, 370/235, 236, 252, 344, 347, 395.21, 395.4, 370/395.41, 395.42, 442, 458, 468, 478; 700/11, 12, 13
See application file for complete search history.

(56) References Cited

U.S. PATENT DOCUMENTS

| | | | |
|---|---|---|---|
| 6,031,844 A * | 2/2000 | Lin ........................... | 370/431 |
| 6,690,655 B1 * | 2/2004 | Miner et al. ................ | 370/278 |
| 6,760,328 B1 * | 7/2004 | Ofek .......................... | 370/389 |
| 6,826,620 B1 * | 11/2004 | Mawhinney et al. ........ | 709/235 |
| 6,904,054 B1 * | 6/2005 | Baum et al. ................ | 370/467 |
| 7,028,088 B1 * | 4/2006 | Koperda et al. ............ | 709/229 |
| 2001/0034558 A1 * | 10/2001 | Hoskins ...................... | 700/13 |
| 2002/0057709 A1 * | 5/2002 | Edmon et al. ............... | 370/442 |
| 2002/0159513 A1 * | 10/2002 | Williams et al. ............ | 375/222 |

OTHER PUBLICATIONS

Vincent Bemmel, "MPCP and TDM Services", IEEE 802.3ah Ethernet in the First Mile Task Force Presentation, Mar. 2002, pp. 1-17, http://www.ieee803.org/3/efm/public/mar02/index.html.

* cited by examiner

*Primary Examiner*—Aung S Moe
*Assistant Examiner*—Feben Haile
(74) *Attorney, Agent, or Firm*—Hunton & Williams, LLP

(57) ABSTRACT

A technique for delivering and enforcing network quality of service from a head-end to a plurality of outstations is disclosed. In one embodiment, the technique is realized by assigning a transmit duration for each one of the plurality of outstations by the head-end; and assigning a transmit frequency for each one of the plurality of outstations by the head-end; wherein bandwidth for each one of the plurality of outstations is adjusted dynamically at the head-end. In addition, a control message may be received from an outstation indicating extra capacity at the outstation where the extra capacity may be allocated for one or more of burst capacity and best effort traffic.

20 Claims, 4 Drawing Sheets

TECHNIQUE FOR DELIVERING AND ENFORCING NETWORK QUALITY OF SERVICE TO MULTIPLE OUTSTATIONS

CROSS-REFERENCE TO RELATED APPLICATIONS

This patent application claims priority from U.S. Provisional Patent Application No. 60/364,024 filed Mar. 15, 2002, which is hereby incorporated by reference herein in its entirety.

FIELD OF THE INVENTION

The present invention relates generally to quality of service for a network and, more particularly, to a technique for delivering and enforcing network quality of service to multiple outstations.

BACKGROUND OF THE INVENTION

Customer expectations for computer network connectivity, in particular Internet connectivity, have risen dramatically with a shift in focus from a research environment of the 1980s to a business-connectivity environment of present day. Network Service Providers (NSPs) of all types are now expected to deliver reliable, high-performance connectivity. These expectations also create opportunity for new revenue streams for NSPs. Higher bandwidths, lower latencies, managed rates of jitter and other qualities of service characterize higher levels of connectivity services. Quality of service generally refers to measuring, improving and, to some extent, guaranteeing in advance transmission rates, error rates and other characteristics. These higher levels of service attract higher prices and create greater demand.

A NSP shares its available bandwidth among its subscribers. Many connection standards specify mechanisms to deliver "fairness" (e.g., International Telecommunication Union-Telecommunication (ITU-T) 983.1, clause 8.3.5.10). Moreover, existing solutions are designed to optimize for fairness of network access. However, this fairness is at odds with delivering multiple levels of service. In fact, existing systems do not consider the value of prescribed unfairness in terms of distinguishing service levels available to various customers.

Current Quality-of-Service (QoS) mechanisms require collaboration and complex protocols to be shared with outstations. For example, some current systems employ additional protocol support at a head-end and the outstations for exchanging and processing scheduling information. The head-end may include a device (or system) that allows a service provider to offer connectivity services (e.g., high-speed Internet access). The outstation may include a device that seeks (or receives) data services from the service provider. Examples of outstations may include a modem (e.g., a cable modem, Digital Subscriber Line (DSL) modem) or other device for accessing data (e.g., telephone). Outstations are typically involved in a scheduling activity, which requires the outstations to be synchronized. Some methods (e.g., Data Over Cable Service Interface Specification (DOCSIS)) may transmit an entire schedule to all outstations, which means that information, such as subnet information, schedule information, and capacity information, are all visible among the outstations. However, this information generally includes service provider-sensitive information, which is not intended to be visible to end subscribers or competitors, for example.

In view of the foregoing, it would be desirable to provide a technique for delivering and enforcing network quality of service to a plurality of outstations which overcomes the above-described inadequacies and shortcomings. More particularly, it would be desirable to provide a technique for delivering and enforcing network quality of service to a plurality of outstations in an efficient and cost effective manner.

SUMMARY OF THE INVENTION

According to the present invention, a technique for delivering and enforcing network quality of service to a plurality of outstations is provided. In one exemplary embodiment, the technique is realized by a method for delivering network quality of service from a head-end to a plurality of outstations, comprising the steps of: assigning a transmit duration for each one of the plurality of outstations by the head-end; and assigning a transmit frequency for each one of the plurality of outstations by the head-end; wherein bandwidth for each one of the plurality of outstations is adjusted dynamically at the head-end.

In accordance with other aspects of this exemplary embodiment of the present invention, jitter for each one of the plurality of outstations is adjusted dynamically at the head-end; the method further comprises the step of receiving a control message from an outstation indicating extra capacity at the outstation; the step of allocating the extra capacity for one or more of burst capacity and best effort traffic; wherein burst capacity represents capacity over an outstation's committed information rate; wherein best effort traffic represents a committed information rate of zero; and wherein different service levels are enforced.

In accordance with another aspect of this exemplary embodiment of the present invention, a computer signal embodied in a carrier wave readable by a computing system and encoding a computer program of instructions for executing a computer process performing the method recited above.

In another exemplary embodiment, a system for delivering network quality of service from a head-end to a plurality of outstations, comprises a scheduler at the head-end for assigning a transmit duration for each one of the plurality of outstations; and assigning a transmit frequency for each one of the plurality of outstations; wherein bandwidth for each one of the plurality of outstations is adjusted dynamically at the head-end.

In accordance with other aspects of this exemplary embodiment of the present invention, jitter for each one of the plurality of outstations is adjusted dynamically at the head-end; a control message is received from an outstation indicating extra capacity at the outstation; the extra capacity is allocated for one or more of burst capacity and best effort traffic; burst capacity represents capacity over an outstation's committed information rate; best effort traffic represents a committed information rate of zero; and different service levels are enforced.

In another exemplary embodiment, an article of manufacture for delivering network quality of service from a head-end to a plurality of outstations comprises at least one processor readable carrier; and instructions carried on the at least one carrier; wherein the instructions are configured to be readable from the at least one carrier by at least one processor and thereby cause the at least one processor to operate so as to: assign a transmit duration for each one of the plurality of outstations by the head-end; and assign a transmit frequency for each one of the plurality of outstations by the head-end; wherein bandwidth for each one of the plurality of outstations is adjusted dynamically at the head-end.

In accordance with other aspects of this exemplary embodiment of the present invention, a control message is received from an outstation indicating extra capacity at the outstation; the extra capacity is allocated for one or more of burst capacity and best effort traffic; burst capacity represents capacity over an outstation's committed information rate; and best effort traffic represents a committed information rate of zero.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

The present invention performs outstation quality of service (QoS) delivery/enforcement from a head-end by utilizing systems which may explicitly schedule data transmissions from outstations, such as, for example Passive Optical Networks (PON) and DOCSIS (cable-industry standard). By varying transmit duration and transmit frequency of a timeslot (e.g., allocation/timeslice) over a scheduling cycle, bandwidth and/or jitter seen by the outstations may be adjusted without requiring the outstations to actively participate in a scheduling operation.

Figure 1:
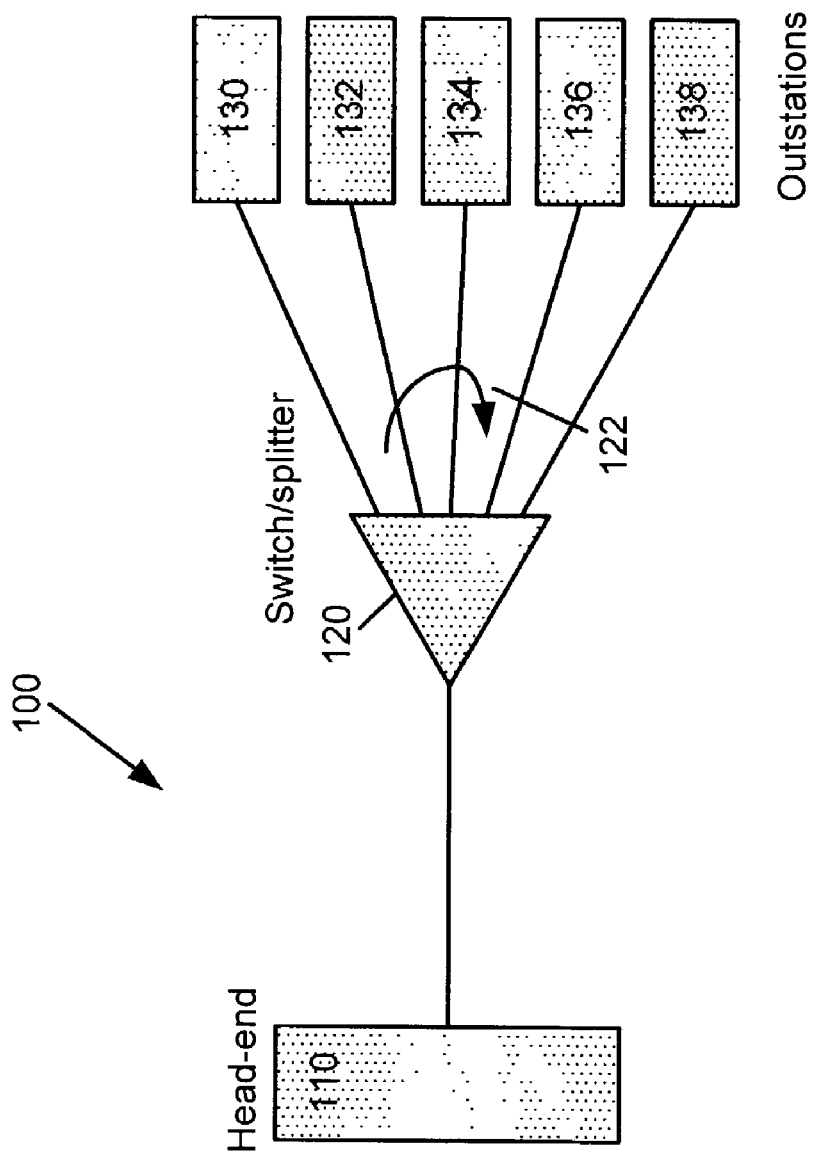
FIG. 1 is a network supporting a head-end and a plurality of outstations in accordance with the present invention.

FIG. 1 is a network 100 supporting a head-end 110 and a plurality of outstations 130, 132, 134, 136, and 138 in accordance with the present invention. Head-end devices generally represent a point of presence (POP) location, which may be controlled by a central office. For example, a head-end device may include a wiring closet or an extension of a central office used by a metro provider. An outstation generally represents a customer premise equipment. Switch/splitter 120 enables head-end 110 to communicate to the plurality of outstations 130-138, where upstream bandwidth may be shared among the plurality of outstations 130-138 according to a predetermined algorithm. Network 100 may include Full-Services Access Network (FSAN) (ITU-T 983.1-based) networks or Ethernet Passive Optical Network (EPON), for example. A scheduler running at the head-end 110 may follow a cyclic pattern 122 to determine which outstation should be allowed to transmit and a duration for each transmission. The cyclic pattern may be shared with the outstations (e.g., in DOCSIS-based systems) or not (e.g., in Etherburst-based systems). Other patterns, such as acyclic or random, may be used.

According to another embodiment of the present invention, other topologies, such as a star or an add/drop topology may be implemented. In particular, a point to consecutive point topology may support the embodiments of the present invention.

Figure 2:
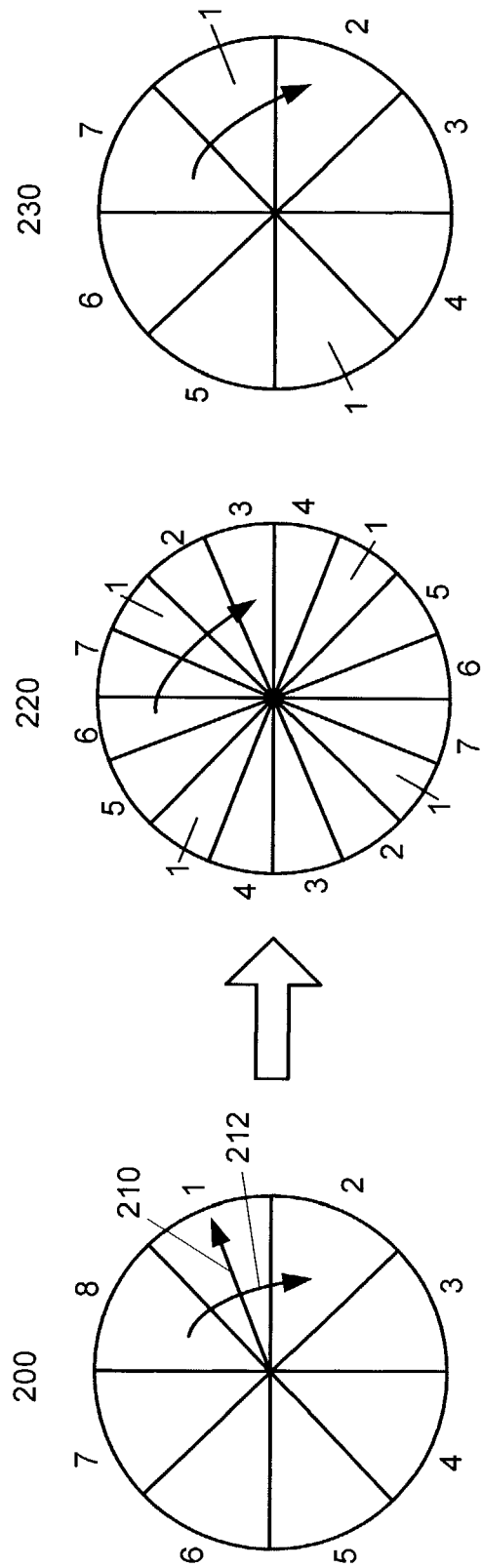
FIG. 2 illustrates a timeslot assignment in accordance with the present invention.

FIG. 2 illustrates a timeslot assignment in accordance with the present invention. A scheduler may run in a head-end as a spinner on a disk where an outstation (e.g., 1) over whose zone a needle 210 is passing is allowed to transmit. Arrow 212 indicates which direction the scheduler is running. In this example, outstation 2 will transmit next. This may be considered akin to a token in a token-ring protocol, but without a need to perform token management. In this example, assuming outstations 1 to 8 are populated, scheduler 200 may be considered similar to a "round-robin" pattern, where each outstation is given an equal share of available bandwidth.

The size of a given zone and the number of times an outstation appears in each cycle may be adjusted for dynamic bandwidth and jitter management in accordance with the present invention. Bandwidth may be defined as data transmitted per unit time. Bandwidth may be adjusted by changing the size of an outstation's zone and/or by changing the number of appearances of an outstation through a cycle.

Outstations may receive bandwidth allocations in at least two ways, as shown by scheduler 220 and scheduler 230. A substantially equivalent amount of bandwidth is available to Outstation 1 in both cases of scheduler 220 and scheduler 230. As shown in scheduler 230, there may be a longer delay between slot arrivals, which contributes to traffic jitter. As shown in scheduler 220, there may be greater overhead in guard bands separating timeslots, but jitter may be lower. Depending on a desired effect, jitter, latency as well as bandwidth may be adjusted.

Timeslots are drawn of equal size/duration only for simplicity. However, timeslots for different outstations may be of different durations. Because a head-end controls timeslot assignment, bandwidth and jitter may be adjusted dynamically within the same cycle or other cycle (e.g., next cycle).

Figure 3:
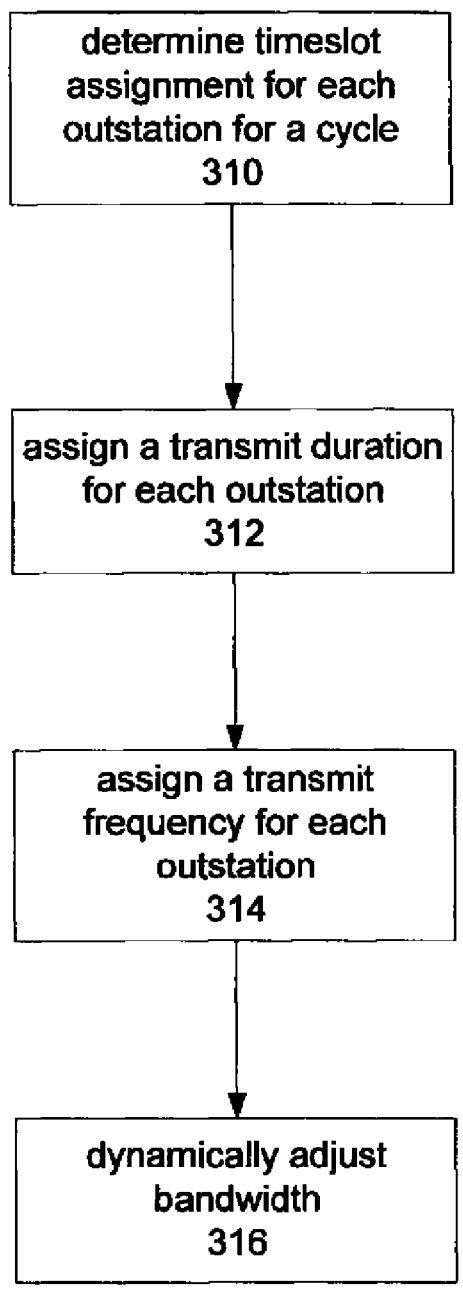
FIG. 3 is a flowchart for dynamically adjusting bandwidth and jitter in accordance with the present invention.

FIG. 3 is a flowchart for dynamically adjusting bandwidth and jitter in accordance with the present invention. At step 310, a timeslot assignment for each outstation may be determined for a cycle. At step 312, a transmit duration may be assigned for each outstation. The transmit duration may be represented by the size of a given zone. At step 314, a transmit frequency may be assigned for each outstation. The transmit frequency may refer to how often an outstation may transmit during a cycle. At step 316, bandwidth may be dynamically adjusted for a desired effect.

According to another embodiment of the present invention, when an outstation indicates inactivity (e.g., an outstation has no data to send), "burst" and/or "best-effort" service levels (which may be billed separately) may be available by dynamically adjusting bandwidth of one or more other outstations. The present invention enables definition and enforcement of service levels that may be offered by network service providers. This further enables specification of feature-rich service level agreements (SLAs) which may support a variety of qualities of service to various customers. Such service levels may be charged at appropriate rates at the discretion of a service provider or other entity. Thus, the present invention may impose service levels, e.g. prescribed unfairness, so that customers may receive greater benefits at greater costs.

An outstation may issue a control message to a head-end. In particular, an outstation may release a timeslot by sending a control message, which may occur at a beginning or during the timeslot. This may likely occur if the outstation has nothing left to send (e.g., the outstation is inactive). This capability may be used to conserve capacity. For example, rather than leaving a link idle, a next timeslot may begin early.

In addition, "burst" and "best-effort" levels of service may be defined. "Burst" capacity may be defined as capacity over and above an outstation's committed information rate (CIR). CIR represents a lower or upper bound of bandwidth a service provider has guaranteed to deliver. A service provider may choose to measure and charge extra for burst capacity. "Best-effort" traffic (e.g., characterized as CIR=0) may be sent in an absence of any other traffic during periods of network idleness. Because of the bursty nature of data traffic, such opportunities may arise with relative frequency, thereby forming a viable service level. Best effort traffic, which generally does not receive an assigned timeslot, may therefore be defined.

The present invention allows specific assignment of CIR and burst capacities, as bandwidth is explicitly allocated to outstations. In the event the network is not at capacity, or if capacity is released by an idle outstation, a head-end may allocate that extra capacity for burst or best-effort traffic according to SLAs, the provider's policy, and/or other information.

Figure 4:
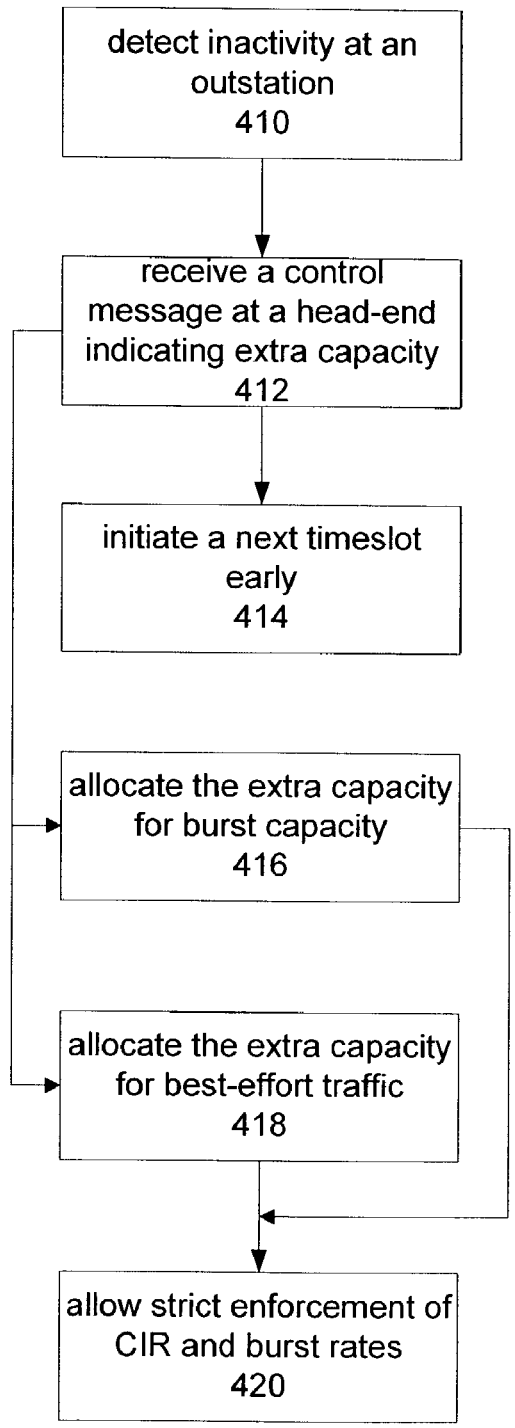
FIG. 4 is a flowchart for allocating extra capacity in accordance with the present invention.

FIG. 4 is a flowchart for allocating extra capacity in accordance with the present invention. At step 410, inactivity at an outstation may be detected. At step 412, a control message may be received at a head-end wherein the control message indicates extra capacity. When extra capacity is detected, a next timeslot may be initiated early to conserve capacity, at step 414. At step 416, the extra capacity may be allocated for burst capacity. At step 418, the extra capacity may be allocated for best-effort traffic. At step 420, strict enforcement of CIR and burst rates may be supported on even idle connections.

The present invention enforces capacity allocations. For example, a service provider offering a level of service to a client group whose total CIR does not near the capacity of a link may see that client group benefit free of charge from available uncommitted link capacity. The client group thus has no motivation to move to a higher-cost higher-CIR service offering. When problems arise as the link becomes congested, that client group may perceive their received level of service to have degraded. The present invention allows strict enforcement of CIR and burst rates even on otherwise-idle connections.

Because bandwidth is strictly allocated to each outstation, rather than employing a statistically-multiplexed allocation as for pure Ethernet, the present invention allows for accounting and billing of capacity and control over transmission jitter. The present invention may further support applications or services requiring different jitter, latency and bandwidth characteristics.

The present invention dynamically controls bandwidth allocation and outstation QoS at the head-end. Policy and resource utilization may be controlled exclusively by the head-end, which will generally be service-provider equipment. Thus, as scheduler and other information are not shared with outstations, network operations are not compromised nor is bandwidth consumed without detection. In addition, the present invention allows service providers to cap bandwidth/Class of Service (CoS) based on SLAs from within a service-provider controlled domain. CoS is a way of managing traffic in a network by grouping similar types of traffic together and treating each type as a class within its own level of service priority. This is in direct contrast to providers of Gigabit Ethernet service, for example, where traffic throttling is controlled at an ingress Customer Premise Equipment (CPE), without the ability to perform strict regulation of burst and "best-effort" allocations.

At this point it should be noted that delivering and enforcing network quality of service to a plurality of outstations in accordance with the present invention as described above typically involves the processing of input data and the generation of output data to some extent. This input data processing and output data generation may be implemented in hardware or software. For example, specific electronic components may be employed in a node or similar or related circuitry for implementing the functions associated with delivering and enforcing network quality of service to a plurality of outstations in accordance with the present invention as described above. Alternatively, one or more processors operating in accordance with stored instructions may implement the functions associated with delivering and enforcing network quality of service to a plurality of outstations in accordance with the present invention as described above. If such is the case, it is within the scope of the present invention that such instructions may be stored on one or more processor readable media, or transmitted to one or more processors via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for delivering network quality of service from a head-end to a plurality of outstations, the method comprising the steps of:
   assigning a transmit duration for each one of the plurality of outstations for a cycle by the head-end;
   receiving a control message from an outstation indicating extra capacity at the outstation; and
   assigning a transmit frequency via a scheduler for each one of the plurality of outstations by the head-end, the scheduler running as a spinner on a disk having zones for each of the plurality of outstations, wherein the outstation over whose zone a needle of the spinner is passing is allowed to transmit, and wherein the transmit frequency is a number of times that the outstation transmits during the cycle;
   wherein bandwidth for each one of the plurality of outstations is adjusted dynamically for the cycle at the head-end.

2. The method of claim 1, wherein jitter for each one of the plurality of outstations is adjusted dynamically for the cycle at the head-end.

3. The method of claim 1, further comprising the step of:
   allocating the extra capacity for one or more of burst capacity and best effort traffic.

4. The method of claim 3, wherein burst capacity represents capacity over an outstation's committed information rate.

5. The method of claim 3, wherein best effort traffic represents a committed information rate of zero.

6. The method of claim 3, wherein different service levels are enforced.

7. A non-transitory processor readable storage medium containing code for executing a computer process performing the method recited in claim 1.

8. A system for delivering network quality of service from a head-end to a plurality of outstations, the system comprising:
   a scheduler, at the head-end for assigning a transmit duration for each one of the plurality of outstations for a cycle, receiving a control message from an outstation indicating extra capacity at the outstation, and assigning a transmit frequency for each one of the plurality of outstations, the scheduler running as a spinner on a disk having zones for each of the plurality of outstations, wherein the outstation over whose zone a needle of the spinner is passing is allowed to transmit, and wherein the transmit frequency is a number of times that the outstation transmits during the cycle;
   wherein bandwidth for each one of the plurality of outstations is adjusted dynamically for the cycle at the head-end.

9. The system of claim 8, wherein jitter for each one of the plurality of outstations is adjusted dynamically for the cycle at the head-end.

10. The system of claim 8, wherein the extra capacity is allocated for one or more of burst capacity and best effort traffic.

11. The system of claim 10, wherein burst capacity represents capacity over an outstation's committed information rate.

12. The system of claim 10, wherein best effort traffic represents a committed information rate of zero.

13. The system of claim 10, wherein different service levels are enforced.

14. An article of manufacture for delivering network quality of service from a head-end to a plurality of outstations, the article of manufacture comprising:
   a non-transitory processor readable storage medium containing code;
   wherein the code is configured to be readable by at least one processor and thereby cause the at least one processor to operate so as to:
   assign a transmit duration for each one of the plurality of outstations for a cycle by the head-end;
   receive a control message from an outstation indicating extra capacity at the outstation; and
   assign a transmit frequency via a scheduler for each one of the plurality of outstations by the head-end, the scheduler running as a spinner on a disk having zones for each of the plurality of outstations, wherein the outstation over whose zone a needle of the spinner is passing is allowed to transmit, and wherein the transmit frequency is a number of times that the outstation transmits during the cycle;
   wherein bandwidth for each one of the plurality of outstations is adjusted dynamically for the cycle at the head-end.

15. The article of manufacture of claim 14, wherein the extra capacity is allocated for one or more of burst capacity and best effort traffic.

16. The article of manufacture of claim 15, wherein burst capacity represents capacity over an outstation's committed information rate.

17. The article of manufacture of claim 15, wherein best effort traffic represents a committed information rate of zero.

18. The method of claim 1, wherein the bandwidth for each one of the plurality of outstations is adjusted dynamically comprises at least one of assigning a longer delay between the transmit durations and assigning a greater overhead in guard bands separating the transmit durations.

19. The system of claim 8, wherein the bandwidth for each one of the plurality of outstations is adjusted dynamically comprises at least one of assigning a longer delay between the transmit durations and assigning a greater overhead in guard bands separating the transmit durations.

20. The article of manufacture of claim 14, wherein the bandwidth for each one of the plurality of outstations is adjusted dynamically comprises at least one of assigning a longer delay between the transmit durations and assigning a greater overhead in guard bands separating the transmit durations.

* * * * *